UNITED STATES PATENT OFFICE.

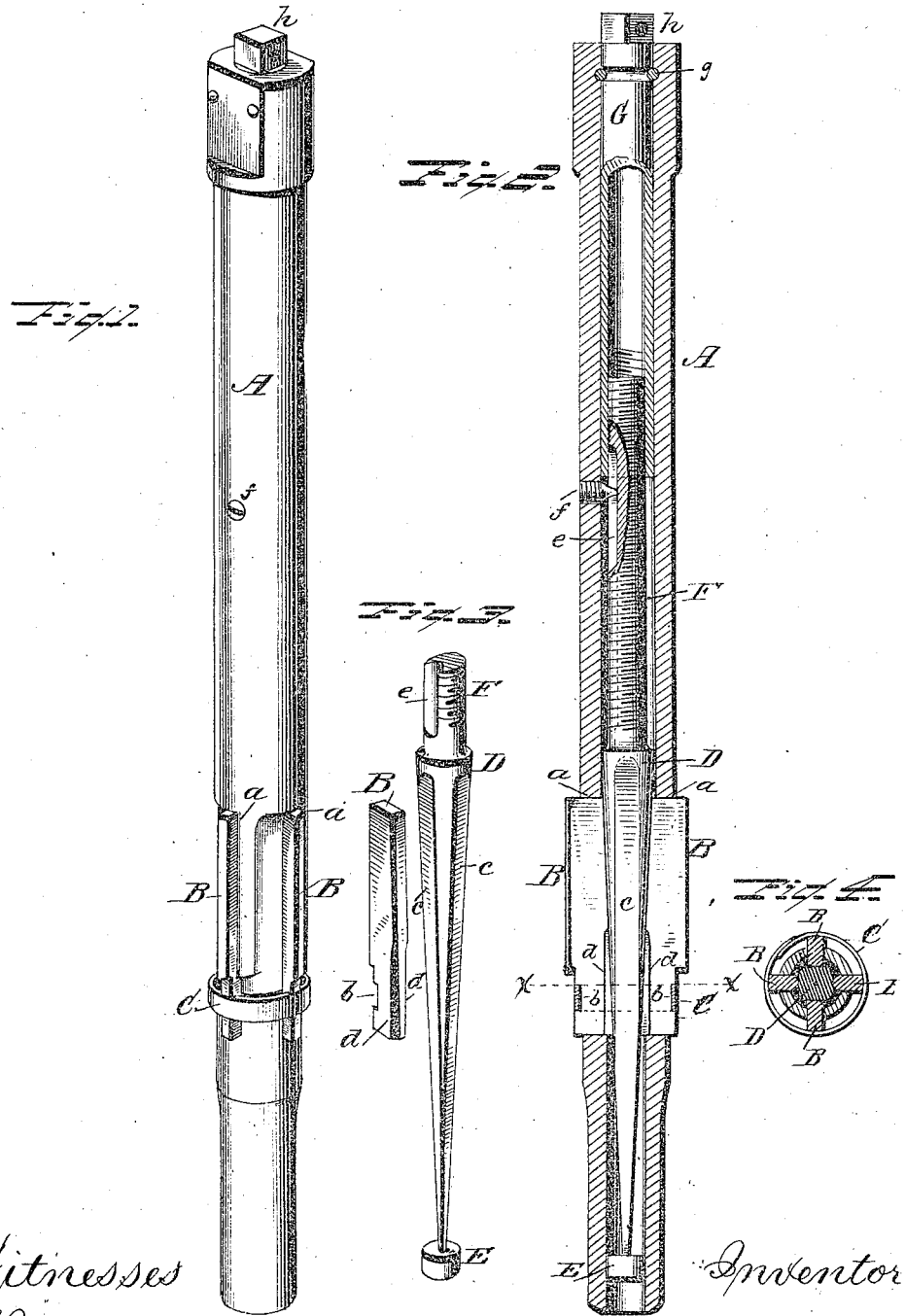

PETER J. CLEVER, OF BRUNSWICK, MISSOURI.

EXPANDING REAMER.

SPECIFICATION forming part of Letters Patent No. 532,765, dated January 22, 1895.

Application filed October 8, 1894. Serial No. 525,227. (No model.)

*To all whom it may concern:*

Be it known that I, PETER J. CLEVER, a citizen of the United States, residing at Brunswick, in the county of Chariton and State of Missouri, have invented certain new and useful Improvements in Expanding Reamers; and I do hereby declare that the following is a full, clear, and exact description of the same, reference being had to the annexed drawings, making a part of this specification, and to the letters of reference marked thereon.

The present invention has for its object to provide an expanding reamer for the use of machine and gun workers for the purpose of enlarging holes in metal, and without the necessity of adding to or changing of parts, also for the purpose of cutting counter-sinks for various purposes and for all other uses to which a tool of this character may be found of value.

The invention consists in a tool of the above character that will possess strength and durability and be effective in its operation, and capable of adjustment to any degree of fineness to adapt the tool to various kinds of work or size of hole required, as will be hereinafter described and subsequently pointed out in the claims.

Figure 1 of the drawings is a perspective view of an expanding reamer constructed in accordance with my invention; Fig. 2, an elevation thereof partly in section; Fig. 3, a perspective view in detail of the adjusting device and one of the radial cutters; Fig. 4, a horizontal section of the reamer taken on line $x$ $x$ of Fig. 2.

In the accompanying drawings A represents the hollow arbor or body of the reamer having at its lower end the longitudinal slots $a$ to receive the cutters B. These cutters have grooved seats $b$ to receive a flat circular spring C to retain the cutters in relative position in the slots and admit of the cutters being forced outwardly by means of the adjusting device D.

The device D is tapering and has flat sides $c$ to more effectually bear against the inner edges of the cutters and thereby act with increased effectiveness in forcing them outward.

The lower inner corners of the cutters B are beveled as shown at $d$ to enable them to come in contact with the smaller end of the adjusting device, the tapering of the device rendering the beveling of the corners of the cutters necessary. The longer the taper of the device in proportion to the length of the cutters the greater will be the variety and capacity thereof.

The lower end of the adjusting device D has a guide E which is of such diameter as to nicely fit within the hollow arbor or body A, and the opposite end of the device has a screw threaded shank F in which is formed a longitudinal groove $e$, and engaging with this groove is a pin $f$ which is to prevent the device D from turning on its axis when moved longitudinally.

The adjusting device is moved lengthwise or longitudinally of the arbor or body of the tool by means of a tubular feeder G which has interior screw threads to engage with the threads on the shank F.

The feeder G is suitably swiveled to the end of the hollow body or arbor A as shown at $g$, so as to retain the feeder in place, but admit of its freely rotating to draw in or force out the adjusting device D.

The end of the feeder G has a flat sided projection $h$ whereby the feeder may be turned by a wrench or other tool.

Any form of cutters may be used and various modifications or changes may be made in the details of construction without in any manner departing from the principle of my invention.

Having now fully described my invention, what I claim as new, and desire to secure by Letters Patent, is—

1. An expanding reamer, consisting of a hollow body or arbor having longitudinal slots, cutters located therein, means for forcing out said cutters, consisting of an adjusting device of tapering form and provided with a guide at one end and a screw shank at the opposite end, and a feeder consisting of a tube having screw threads upon its interior which engage the screw threaded shank, said feeder being swiveled to the hollow body or arbor, substantially as and for the purpose described.

2. An expanding reamer, consisting of a hollow body or arbor, cutters located in slots in said body or arbor, a spring encircling the cutters, a tapering adjusting device therefor having upon one end a guide and upon the opposite end a screw shank, and a rotatable tubular feeder having interior screw threads with which the shank engages, substantially as and for the purpose set forth.

In testimony that I claim the above I have hereunto subscribed my name in the presence of two witnesses.

PETER J. CLEVER.

Witnesses:
GEO. KENNEDY,
G. D. KENNEDY